(12) United States Patent
Ekenhorst et al.

(10) Patent No.: US 9,918,484 B2
(45) Date of Patent: Mar. 20, 2018

(54) APPARATUS FOR PRODUCING SOFT ICE CREAM

(71) Applicant: Robert Bosch GmbH, Stuttgart (DE)

(72) Inventors: Dirk Ekenhorst, Osnabrück (DE); Dan Barron, Schaffhausen (CH)

(73) Assignee: Robert Bosch GmbH, Stuttgart (DE)

( * ) Notice: Subject to any disclaimer, the term of this patent is extended or adjusted under 35 U.S.C. 154(b) by 423 days.

(21) Appl. No.: 14/674,307

(22) Filed: Mar. 31, 2015

(65) Prior Publication Data

US 2015/0272163 A1 Oct. 1, 2015

(30) Foreign Application Priority Data

Mar. 31, 2014 (DE) ........................ 10 2014 205 954

(51) Int. Cl.
*A23G 9/20* (2006.01)
*B67D 7/00* (2010.01)
*B67D 1/08* (2006.01)
*B65D 75/58* (2006.01)
*A23G 9/22* (2006.01)
*B67D 7/02* (2010.01)
*B05B 9/04* (2006.01)
*A23G 9/08* (2006.01)
*A23G 9/16* (2006.01)
*A23G 9/28* (2006.01)

(52) U.S. Cl.
CPC ................ *A23G 9/22* (2013.01); *A23G 9/08* (2013.01); *A23G 9/20* (2013.01); *B05B 9/0416* (2013.01); *B65D 75/5883* (2013.01); *B67D 7/0288* (2013.01); *A23G 9/16* (2013.01); *A23G 9/281* (2013.01); *B67D 1/0857* (2013.01)

(58) Field of Classification Search
CPC ... A23G 9/20; A23G 9/00; A23G 9/16; A23G 9/281; B67D 7/0288; B67D 7/66; B67D 1/0857; B05B 9/043; B05B 9/047; B05B 9/0416; B65D 75/5883
USPC ......... 99/323.1, 348, 455; 62/306, 307, 308, 62/342, 343; 141/114, 330; 222/95, 96, 222/212, 209; 261/76, DIG. 75
See application file for complete search history.

(56) References Cited

U.S. PATENT DOCUMENTS

| 3,811,494 | A | 5/1974 | Menzel |
| 4,850,205 | A | 7/1989 | Mills |
| 5,727,713 | A | 3/1998 | Kateman et al. |
| 6,343,724 | B1 * | 2/2002 | Ophardt ............... A47K 5/1202 137/543.23 |

(Continued)

FOREIGN PATENT DOCUMENTS

| DE | 4429077 A1 | 2/1996 |
| EP | 0818151 | 1/1998 |

(Continued)

*Primary Examiner* — Reginald L Alexander
(74) *Attorney, Agent, or Firm* — Michael Best & Friedrich LLP (57) ABSTRACT

An apparatus for producing soft ice cream has a storage container (1) for receiving soft ice cream raw material in liquid form and a refrigeration chamber (4) with a mechanical mixing device (5) installed therein in which the soft ice cream raw material is mixed with air and thus prepared to form soft ice cream. The storage container (1) is a bag (8) which can be inserted into the apparatus, with an integrated single use pump (9) with an opening device (19) for the bag.

16 Claims, 5 Drawing Sheets

(56) References Cited

U.S. PATENT DOCUMENTS

| | | | |
|---|---|---|---|
| 8,201,586 B2* | 6/2012 | Yoshida | B29C 73/166 |
| | | | 141/105 |
| 9,481,560 B2* | 11/2016 | Barron | B65D 75/5883 |
| 2012/0046785 A1* | 2/2012 | Deo | B67D 1/108 |
| | | | 700/231 |
| 2016/0263599 A1* | 9/2016 | Barron | B05B 9/0416 |

FOREIGN PATENT DOCUMENTS

| | | |
|---|---|---|
| EP | 2447649 A2 | 5/2012 |
| WO | 0215710 A2 | 2/2002 |

\* cited by examiner

APPARATUS FOR PRODUCING SOFT ICE CREAM

BACKGROUND OF THE INVENTION

The invention relates to an apparatus for producing soft ice cream.

The invention relates in particular to an apparatus for producing soft ice cream, said apparatus having a storage container for receiving the soft ice cream raw material in liquid form, a refrigeration chamber with a mechanical mixing device installed therein in which the soft ice cream raw material is mixed with air and is thus prepared to form soft ice cream, wherein the storage container communicates with the refrigeration chamber by means of a supply channel, and a dispensing device for the dosed output of soft ice cream from the refrigeration chamber. Ice creams, yoghurt ice creams and similar products are able to be produced using apparatuses of this type and the term soft ice cream in this case includes a plurality of possible end products.

Apparatuses for producing soft ice cream with said basic design have been known for a long time. Thus, EP-0818151, DE-2139917 and U.S. Pat. No. 4,850,205, to name but a few as an example, show apparatuses of this type.

It is also adequately known that apparatuses for producing soft ice cream or ice cream machines always have to be cleaned and maintained very carefully in order to ensure that untainted and sterile soft ice cream is produced and dispensed. Said set of problems is exacerbated because, as a rule, not only do contamination-sensitive raw materials have to be used but because the devices additionally also have to be operated for the most part in warm and contamination-inducing environments.

Various auxiliary devices and methods to improve the cleaning process have naturally been made known over time.

For example, there are washing additives for apparatuses for producing soft ice cream which can be connected directly to water taps or water lines and by way of which rinsing water is able to be introduced directly into the storage container for receiving the soft ice cream raw material in order to rinse through and clean said storage container. There are also appliances with integrated self-cleaning devices which can be operated by the touch of a button and by way of which automatic washing and cleaning operations are able to be triggered. However, practically all known popular apparatuses for producing soft ice cream, even those that comprise a high degree of automation, nevertheless require all the parts that are susceptible to contamination periodically to be broken down and thoroughly cleaned because the routine—type cleaning operations which are associated with normal operation are not effective enough or are simply not reliable enough over longer periods in the majority of cases. Self-cleaning devices can consequently certainly save the servicing personnel a considerable amount of time because the appliances do not need to be taken apart for thorough cleaning as often, however they do not make thorough cleaning operations by breaking down the machine parts that are susceptible to contamination completely unnecessary.

Typically, popular appliances for producing soft ice cream have to be taken apart and cleaned thoroughly either daily or at least twice a week for the reasons mentioned. Obviously, the frequency of said through cleaning operations also depends at least in part on the actual use of the devices as well as also on local official regulations concerning the procedure with these types of contamination-susceptible devices. However, because said thorough cleaning operations are always relatively expensive in time and money, solutions to reduce the necessary number of thorough cleaning operations, whilst safety for consumers remains at least the same or is even improved, are naturally highly desirable.

SUMMARY OF THE INVENTION

It is consequently the object of the invention to provide an improved apparatus for producing soft ice cream which takes account of said requirements.

The solution implies that in the case of a generic apparatus for producing soft ice cream, a storage container is used for receiving the soft ice cream raw material in liquid form, which storage container is realized as an insertable bag, wherein the bag comprises an integrated or integratable single use pump with an opening device for the bag and wherein the single use pump can be connected to a pump drive.

An essential advantage of said solution consists in that it is not just able to be used in soft ice cream machines which have been developed in a targeted manner for the use of bags, but in principle also in soft ice cream machines of standard and conventional design by means of so-called retrofitting kits. As a rule, soft ice cream machines of standard and conventional design have a storage container for receiving the soft ice cream raw material in liquid form which, in the majority of cases, is in the form of a tub, becomes narrower in an outlet region and is often designated in the English language area as a 'hopper. It is therefore basically possible to insert bags, the content of which is also the mentioned soft ice cream raw material in liquid form, into such 'hoppers'. The present invention is not concerned, however, with the concrete development of retrofitting kits for existing soft ice cream machines, on the one hand on account of the plurality of possible machine models and appliance developments and on the other hand because an expert could very easily construct corresponding adapter parts.

Bags for providing the end consumer with a perishable product in as contamination-free a manner as possible are known per se and are also frequently used in the foodstuffs sector. In conjunction with apparatuses for producing soft ice cream, they now allow, however, the soft ice cream raw material in liquid form to be used to remain contamination-free not only during the entire supply chain but also up to the actual first use of the contents in the soft ice cream machine and not to come into contact at all with the environmental air and/or the soft ice cream machine parts for the first time until this point. This is naturally a decisive advantage in relation to popular hopper-based soft ice cream machines, for it is indeed generally known that certain types of pathogen such as, for example, coliform bacteria, in a very short time can multiply to form increasingly dangerous populations insofar as they find ideal conditions for reproduction. It is therefore substantially easier to control disease-causing pathogens being able to propagate at all. In addition, the number of parts susceptible to contamination is reduced.

This is achieved by the bag comprising an integrated or integratable single use pump with an opening device for the bag and wherein the single use pump can be connected to a pump drive. Both the bag and the integrated or integratable single use pump with the opening device for the bag are designed for single use and are therefore thrown away and disposed of after use. Integrated means here that a single use pump with an opening device is already mounted on the output connecting piece of the bag which is connected non-releasably to the bag and the only thing that needs to be done to make the opening device ready for use, for example, is to screw on the single use pump and the elastic covering material of the bag is not penetrated until then. Integratable means here that a single use pump with an opening device as a separate part can be independently obtained and placed in position and that the opening device, however, does not then penetrate the elastic covering material either until the single use pump is screwed on completely. The pump drive itself is not designed for single use, but on account of the desired easy manageability has to be able to be connected to the single use pump in a simple manner, for example by means of a plug-in connection.

In particular in the case of soft ice cream machines which are designed in a targeted manner for the use of bags, but not just in this case, it can be particularly advantageous to accommodate the bag in a receiving cassette. This facilitates the usability and the supporting of the bag in the apparatus for producing soft ice cream, improves the drainability of the bag as a result of positional stabilization and naturally also offers certain protection. In addition, it makes adaptation of the mentioned retrofitting kits easier in the case of soft ice cream machines with a popular and conventional design.

Contamination control in the case of the bag solution with a single use pump is fundamentally better than in the case of rigid storage containers. This reason for this is because the partial vacuum, which the single use pump generates in the bag when draining said bag, results in the bag contracting in the already emptied region and consequently avoiding contact between the (not yet used) soft ice cream raw material and following air or it is at least severely minimized. This leads to better product quality, extensively suppressed microbial growth and consequently to longer shelf life. Obviously, this cannot be realized at all in the case of rigid storage containers as, in this case, used content has forcibly to be replaced by following air. To further improve the contamination control of the bag itself it is provided to provide the single use pumps on the outlet side with a diaphragm valve. Although, as a result of their method of construction as displacement pumps with no or an extremely small amount of return air flow, the single use pumps themselves consequently already provide clear control with reference to back-contamination of the bag, it can be improved even more by the installation of a diaphragm valve.

Finally, by tensioning the bag at three points in the receiving cassette, it is possible to achieve that the bag is tensioned therein in a positionally stable manner. It must be taken into consideration here that during the draining operation bags otherwise collapse into themselves and the wrinkles generated thereby then frequently prevent the further or complete emptying thereof. The achievement of the three-point tensioning is that the single use pump is always located at the lowest point of the bag and the flow to said point is obstructed as little as possible. Furthermore, as good and complete drainability of the bag as possible can certainly also be seen as means to minimize the susceptibility to contamination of the bag as a result of a draining operation that is as complete as possible.

However, it is particularly significant that as a result of the use of single use pumps, cleaning of the same is omitted and consequently all in all expenditure for cleaning the soft ice cream machine is reduced quite considerably.

BRIEF DESCRIPTION OF THE DRAWINGS

Two exemplary embodiments of the invention are described in more detail below by way of drawings, in which.

DETAILED DESCRIPTION

Figure 1:
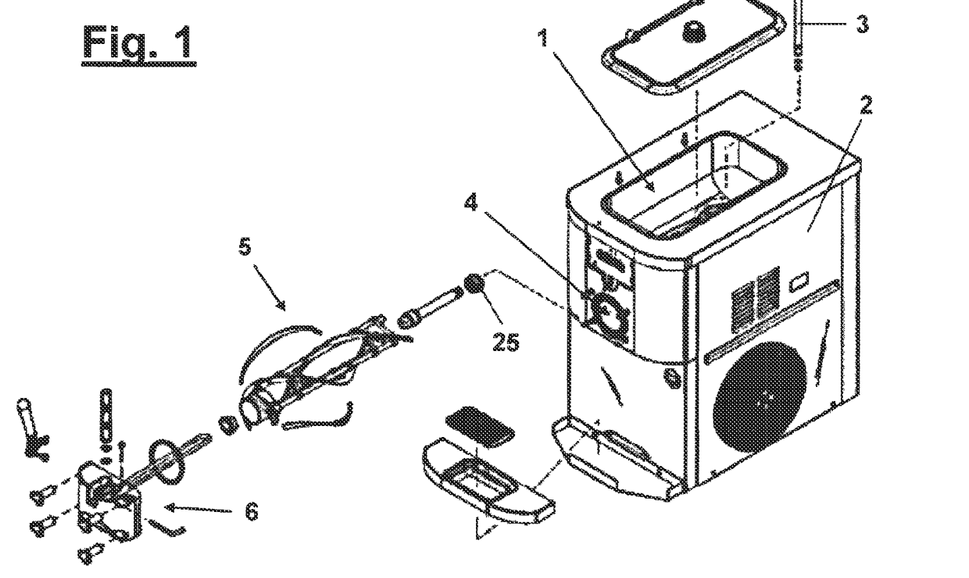
FIG. 1 shows an apparatus for producing soft ice cream according to the prior art.

FIG. 1 shows an apparatus for producing soft ice cream according to the prior art. The representation is provided not only for the better understanding of the prior art but, as shown again further below, also on account of the possibility for retrofitting such machines. However, only the parts of said machine which are important for understanding are given in detail below.

The apparatus for producing soft ice cream shown in FIG. 1, by way of which therefore a machine for producing frozen or semi-frozen foods such as, for example, ice cream or yoghurt mixtures is meant, has a refrigerated storage container 1 for receiving the soft ice cream raw material in liquid or at least flowable form which is usually situated in the upper region of a machine body 2. The storage container 1, in this case, is mostly developed in the shape of a tub, becomes narrower in an outlet region and is consequently usually designated in the English language region as a 'hopper'. The soft ice cream raw material is delivered by means of a supply channel 3 (shown extracted in this case) together with air to a refrigeration chamber 4 which is located below. Said liquid is brought into a frozen or semi-frozen state in the refrigeration chamber 4 and with the aid of mixing device 5 is mixed thoroughly in a homogenous manner with the soft ice cream raw material and chilled further. The soft ice cream consistency of the product to be produced is generated in this manner. Said product is forwarded in this state to a dispensing valve 6.

Figure 2:
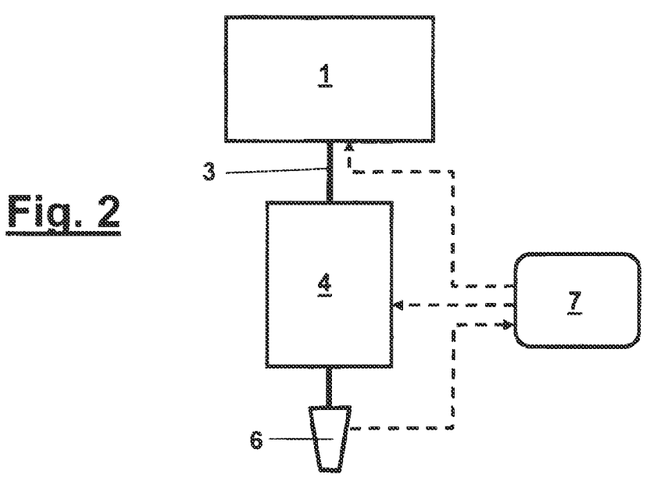
FIG. 2 shows a general block diagram of an apparatus for producing soft ice cream.

FIG. 2 shows for supplementation another general block diagram which can be read both for the machine according to the prior art described in FIG. 1 and for an apparatus according to the invention for producing soft ice cream. The material flow, namely from the storage container 1 via the supply channel 3 into the refrigeration chamber 4 with the mixing device and from there to the dispensing valve 6, is shown in a schematic manner. In addition, depending on the model of the machine, there is naturally a control device 7 by way of which the interaction between all the components is controlled.

Figure 3:
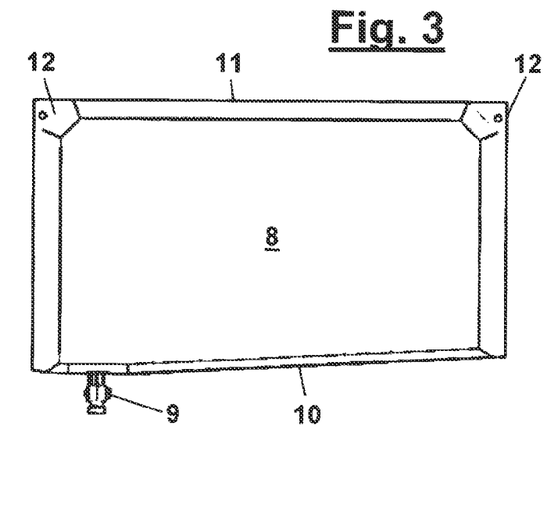
FIG. 3 shows a top view of a bag with an integrated single use pump.

FIG. 3 then shows a top view of a bag 8 with an integrated single use pump 9. The bag 8, in this case, is in a substantially flat, rectangular form and the single use pump 9 is situated (in the operating position) on a bottom side surface 10. Suspension eyes 12 are situated on the edges of the opposite upper side surface 11 (in the operating position). The bags 8 can be tensioned at its respective site of use using the suspension eyes 12 so that it does not collapse into itself during the draining operation.

Figure 8:
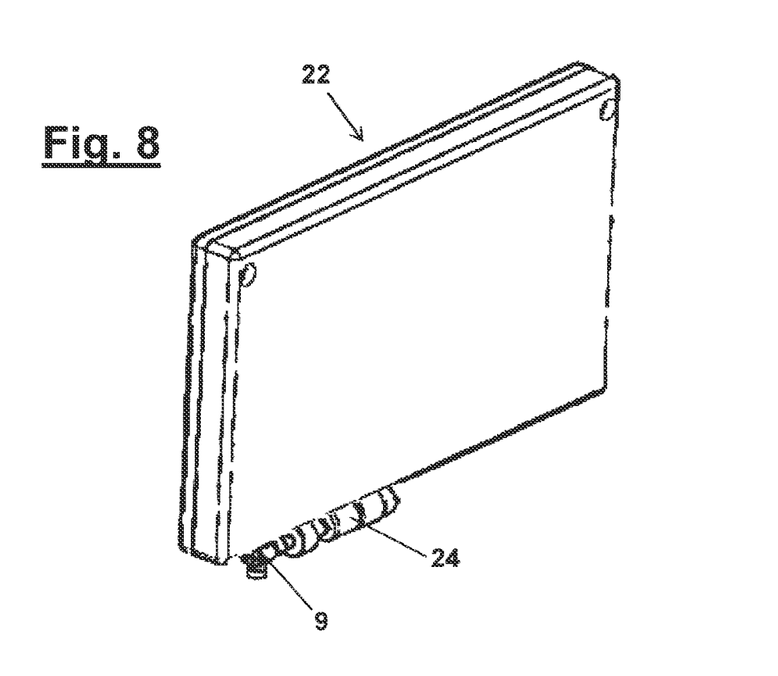
FIG. 8 shows the closed receiving cassette of FIG. 4 with a connection produced between the single use pump and a pump drive.
Figure 9:
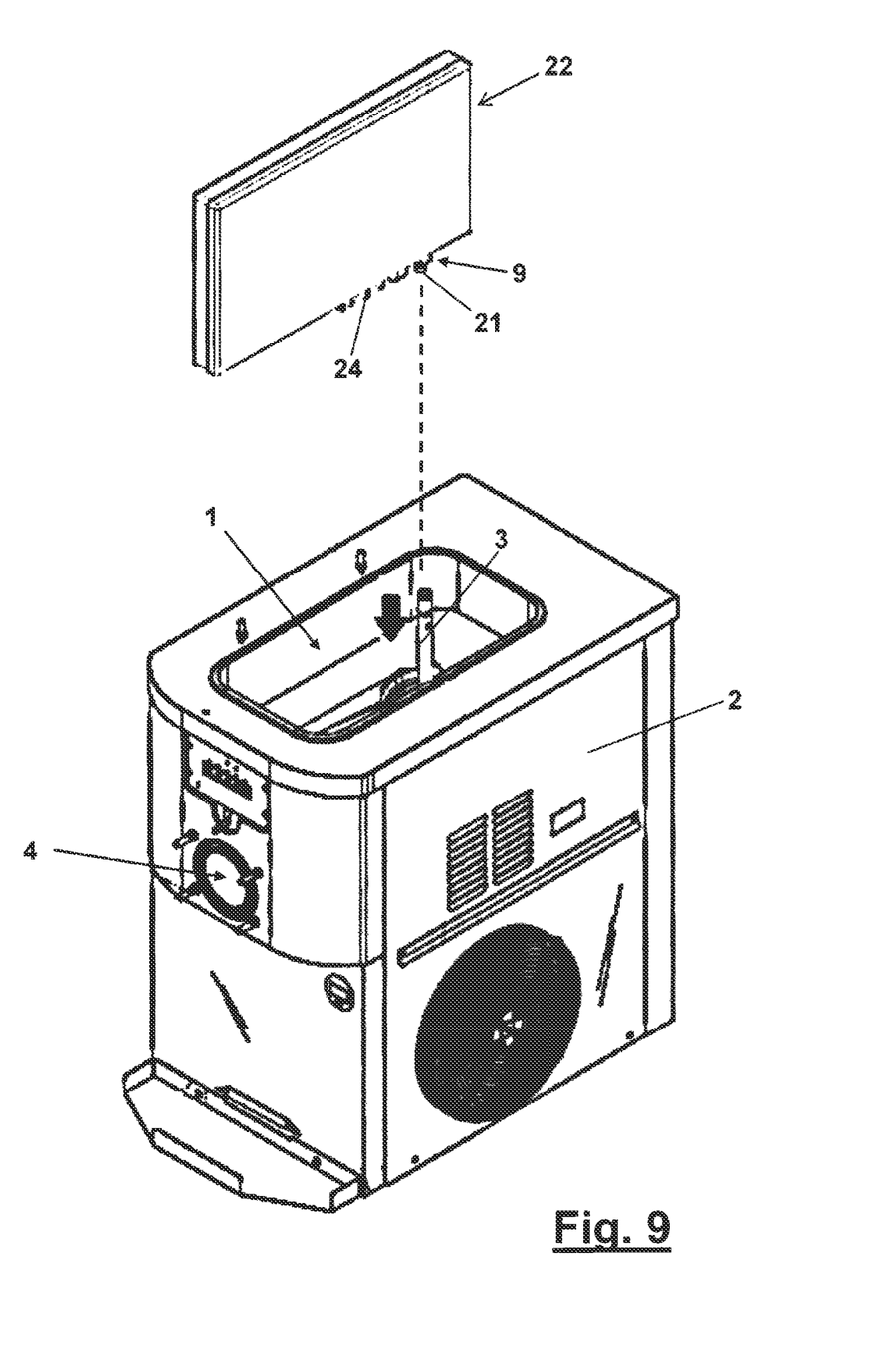
FIG. 9 shows the apparatus for producing soft ice cream according to FIG. 1 with the receiving cassette of FIG. 8 ready for use.

A bag 8 of this type can now serve either as an independent storage container (cf. FIG. 10 in this respect) or it can be inserted into an existing storage container of an ice cream machine according to the prior art (i.e. as a retrofitting solution, cf. FIG. 9 in this respect). In both cases, it can additionally be inserted into a receiving cassette 22 for receiving and stabilizing the bag 8 (see FIGS. 7 and 8 in this respect). Using such a receiving cassette, not only is better protection of the bag obtained, but it can also serve to achieve that the collapsing of the bag during the draining operation does not hinder complete as possible drainability in an unnecessary manner. Particularly in the case of retrofitting solutions, it should naturally also be expected that, depending on the model of the machine, certain additional adapter parts are necessary, for example for supporting and positioning the bag or the receiving cassette; however these are not part of the invention.

Figure 4:
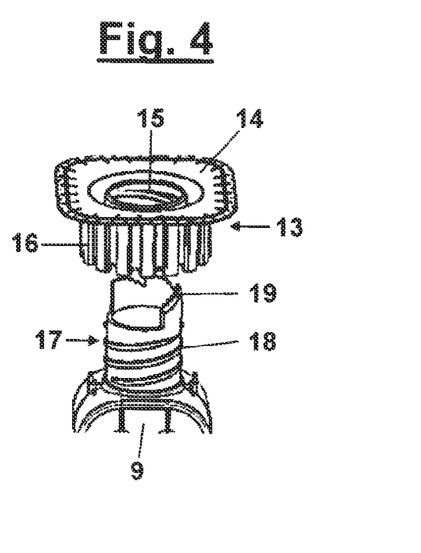
FIG. 4 shows a single use pump with an opening device and an outlet connecting piece for assembly on a bag.
Figure 5:
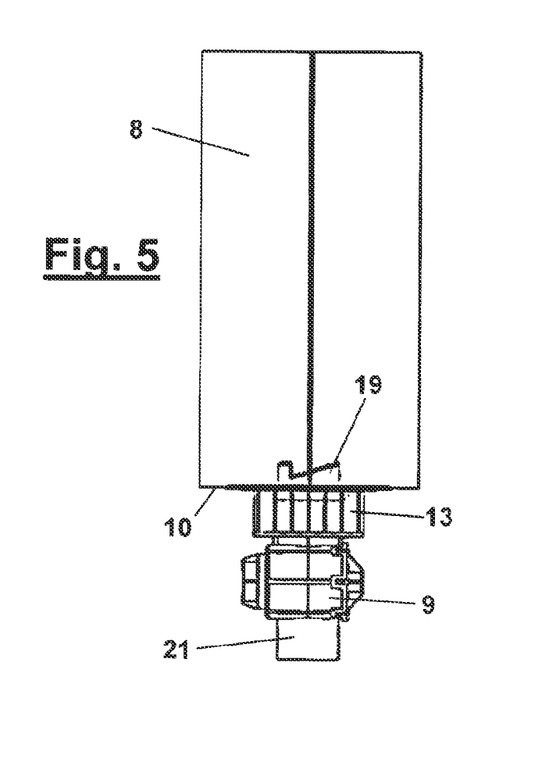
FIG. 5 shows a side view (schematic diagram) of the single use pump with the opening device of FIG. 4 on the flange of a bag with the bag open.

An outlet connecting piece 13 is welded on the bag 8 by way of an end flange 14. The outlet connecting piece is shown in FIG. 4. The outlet connecting piece 13 has an internal thread 15 and its outside region is provide with grip ribs 16. The single use pump 9 (only visible in part here) can be screwed into the internal thread 15 of the outlet connecting piece 13. To this end, the single use pump 9 has an external thread 18 on an inlet tube 17. An opening device 19, which in this case consists of several serrated cutting tooth arrangements, is mounted on the end of the inlet tube 17. If the single use pump 9 is only partially screwed into the outlet connecting piece 13, the opening device 19 is still situated completely inside the outlet connecting piece 13 and the opening device 19 does not contact the elastic covering material of the bag 8 and the bag 8 consequently remains intact and the contents sterile. If the single use pump 9, however, is screwed completely into the outlet connecting piece 13, the elastic covering material of the bag 8 is penetrated by the opening device 19 and the draining of the bag is able to be effected. Said situation is shown in principle in FIG. 5. FIG. 5 therefore shows the opened bag 8 or the state in which the bag 8 is able to be drained by means of the single use pump 9.

Figure 6:
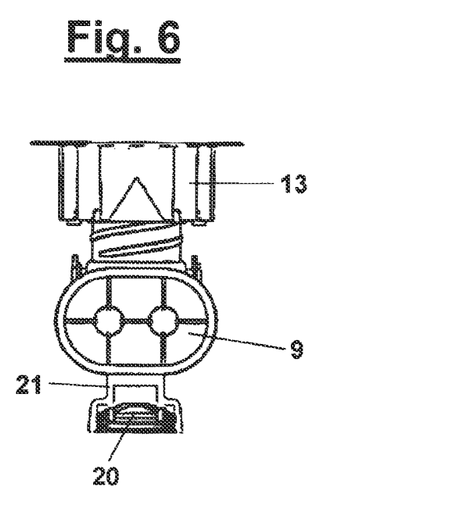
FIG. 6 shows a further single use pump with an opening device and a diaphragm valve on an outlet connecting piece.

FIG. 6 shows a further single use pump 9 designed in a similar manner to that of FIG. 4 with an opening device 19 and a diaphragm valve 20 on an outlet tube 21. The opening device 19 is not visible in this case because the single use pump 9 is not yet screwed completely into the connecting piece 13 and the opening device 19 is consequently still situated in the interior of the same. However, it is clearly possible to see a diaphragm valve 20 here (shown in partial cross section) which is situated in the outlet tube 21 of the single use pump 9.

Figure 7:
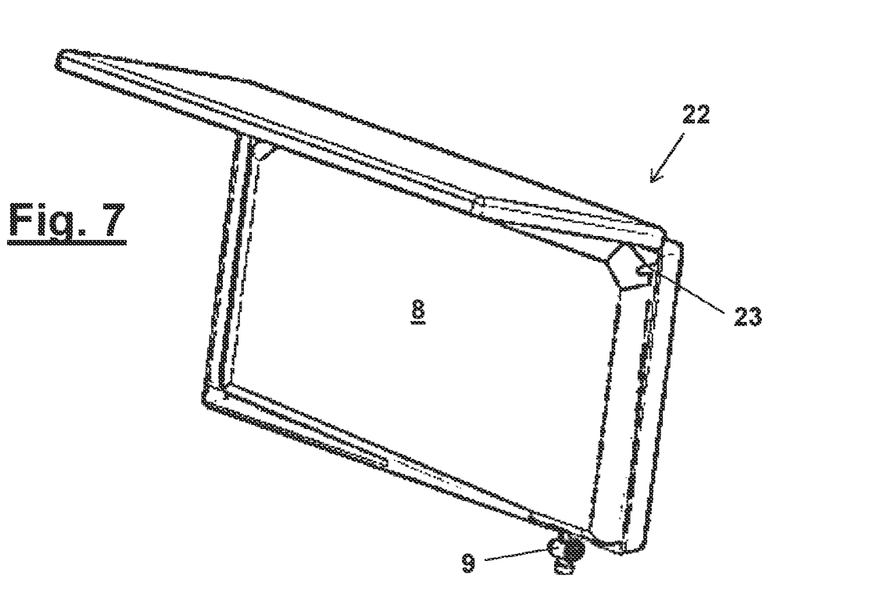
FIG. 7 shows the bag of FIG. 3 in an opened receiving cassette.

FIGS. 7 and 8 show the bag of FIG. 3 in an open and in a closed receiving cassette 22. It can be seen in FIG. 7 that the bag 8 is tensioned at its suspension eyes 12 by means of plug-in pins 23. A third tensioning point is formed by a receiving means of the single use pump 9. It can be seen in FIG. 8 that the single use pump 9 can be connected to a pump drive 24. This latter can also be developed such that the single use pump 9 of the bag 8 inserted into the receiving cassette 22 can be connected in such a manner to the pump drive 24 that the receiving cassette 22 with the bag 8 and the single use pump 9 and the pump drive 24 form an associated replaceable functional unit.

FIG. 9 then shows the apparatus for producing soft ice cream according to FIG. 1 with the receiving cassette 22 of FIG. 8 ready for use. In this case, therefore, this is a schematic diagram of a retrofitting solution for conventional soft ice cream machines. The bag 8 is situated in the receiving cassette 22 and the pump drive 24 is also already connected to the single use pump 9. As this is simply a schematic diagram, the control connections to the soft ice cream machine as well as mechanical supports for the receiving cassette 22 in the storage container 1 of the soft ice cream machine which are also necessary are naturally not shown. It must, however, be clear that the receiving cassette 22 is inserted (see arrow) in such a way that the outlet tube 21 of the single use pump 9 is placed directly or indirectly by means of a coupling part (not shown) onto the supply channel 3 of the soft ice cream machine such that there is then a connection between the bag 8 and the refrigeration chamber 4 of the soft ice cream machine which leads via the single use pump 9 and the supply channel 3. In this way, the parts which are subject to periodic basic cleaning operations can be limited to the supply channel 3 and the refrigeration chamber 4 of the soft ice cream machine, for the bag 8 itself and the single use pump 9 are certainly designed for single use. It is even conceivable for the supply channel 3 itself also to be provided in addition for single use.

In any case, in the case of said solution the soft ice cream raw material is pumped by means of the single use pump 9 out of the bag 8 into the supply channel 3 where air is added for example by means of a coupling piece 25 with an air filter and is supplied to the refrigerating chamber 4 for at least partial solidification or for increasing the viscosity. The supply of air is naturally essential in the case of soft ice cream production, for the frothing up process as a result of supplying air increases the volume (this is referred to as a so-called overrun). The increase in volume as a result of the frothing up process is approximately 35% for soft ice cream, said circumstance naturally taking into account the dimensioning of the machine parts and the control as a result of the control device 7. However, the statements in said disclosure proceed from the fact that these and also further process-related factors are well known and considered.

Figure 10:
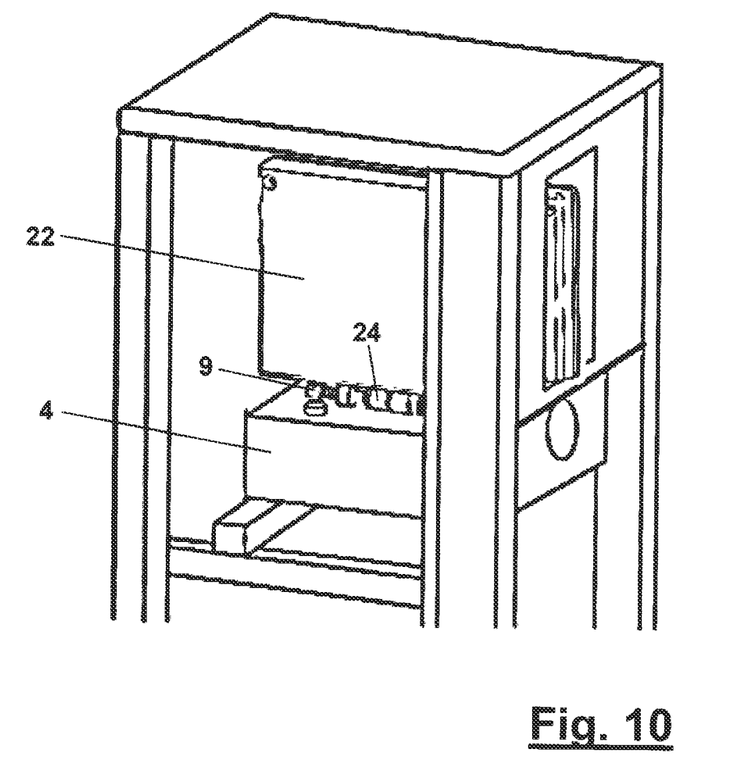
FIG. 10 shows a further apparatus for producing soft ice cream with the receiving cassette of FIG. 8 placed directly on a refrigerating chamber.

FIG. 10 shows a further apparatus for producing soft ice cream having a receiving cassette which is placed directly onto the refrigeration chamber 4. In this connection, this can be the identical receiving cassette 22 to that shown in FIG. 8. In this case, this is a soft ice cream machine which has been developed especially for bags and for receiving cassettes for bags. The bag itself forms the storage container for receiving the soft ice cream raw material in liquid form. In the case of such a solution, the soft ice cream raw material situated in the bag 8 is pumped together with the required air directly into the refrigeration chamber 4 of the apparatus for producing soft ice cream. It can even be provided that for cleaning purposes, in place of a bag with soft ice cream raw material, a bag with a cleaning liquid is used and the cleaning operation runs in an automated manner.

In principle, however, it can be ascertained that with the use of bags with integrated single use pumps not only is the requirement for a refrigerated storage container (the previously mentioned hopper) included in the apparatus for producing soft ice cream not applicable because the soft ice cream raw material in the bag can be stored at normal ambient temperatures on account of the contamination-free delivery, but also the necessary cleaning processes can be very greatly simplified and thus the risk of illnesses caused by foodstuffs is minimized.

However, it is also conceivable that in times of high demand for soft ice cream it is nevertheless possible to provide that the receiving cassettes with the bags contained therein are refrigerated, namely in order to shorten the preparation times between the portion servings. It should also be apparent to the expert that the concept according to the invention is also transferrable to appliances for preparing chilled drinks

LIST OF REFERENCES

1 Storage container
2 Machine body
3 Supply channel
4 Refrigeration chamber
5 Mixing device
6 Dispensing valve
7 Control device
8 Bag
9 Single use pump
10 Lower side surface
11 Upper side surface
12 Suspension eye
13 Outlet connecting piece
14 Flange
15 internal thread
16 Grip ribs
17 Inlet tube
18 External thread
19 Opening device
20 Diaphragm valve
21 Outlet tube
22 Receiving cassette
23 Plug-in pin
24 Pump drive
25 Coupling piece

What is claimed is:

1. An apparatus for producing soft ice cream, said apparatus having a storage container (1) for receiving soft ice cream raw material in liquid form, the apparatus further having a machine body (2) and a refrigeration chamber (4) in the machine body (2), wherein the refrigeration chamber (4) has therein a mechanical mixing device (5) in which the soft ice cream raw material is mixed with ambient air and is thus prepared to form soft ice cream, wherein the storage container (1) communicates with the refrigeration chamber (4) by means of a supply channel (3), and the apparatus further having a dispensing device (6) for the dosed output of soft ice cream from the refrigeration chamber (4), characterized in that the storage container (1) is a bag (8) configured to be inserted into the machine body (2) of the apparatus, wherein the bag (8) comprises an integrated single use pump (9) that includes an opening device (19) for opening the bag (8) to provide communication between the bag (8) and the refrigeration chamber (4), and wherein the single use pump (9) is configured to be connected to a pump drive (24).

2. The apparatus according to claim 1, characterized in that the bag (8) is configured to be inserted into a receiving cassette (22) and wherein the receiving cassette (22) is configured to in turn be inserted into the apparatus for producing soft ice cream.

3. The apparatus according to claim 1, characterized in that the bag (8) is configured to be placed onto the refrigeration chamber (4) of the apparatus for producing soft ice cream and is consequently suitable for soft ice cream machines which have been developed for use with bags.

4. The apparatus according to claim 1, characterized in that the integrated single use pump (9) is configured to be screw connected onto an outlet connecting piece (13) which is connected to the bag (8), wherein the opening device (19) does not become effective until the single use pump (9) has been screwed on completely and not until the pump penetrates elastic sleeve material of the bag (8).

5. The apparatus according to claim 1, characterized in that on an outlet tube (21) the single use pump (9) has a diaphragm valve (20) which is at least approximately airtight and is configured to be coupled directly or indirectly to the supply channel (3).

6. The apparatus according to claim 2, characterized in that the bag (8) is configured to be tensioned in the receiving cassette (22) by means of a three-point tensioning means (9, 12).

7. The apparatus according to claim 2, characterized in that the single use pump (9) of the bag (8) inserted into the receiving cassette (22) is configured to be connected to the pump drive (24) such that the receiving cassette (22) with the bag (8) and the single use pump (9) and the pump drive (24) form an associated replaceable functional unit.

8. A storage bag for an apparatus for producing soft ice cream, said apparatus having a storage container (1) for receiving soft ice cream raw material in liquid form, the apparatus further having a machine body (2) and a refrigeration chamber (4) in the machine body (2), wherein the refrigeration chamber (4) has therein a mechanical mixing device (5) in which the soft ice cream raw material is mixed with ambient air and is thus prepared to form soft ice cream, wherein the storage container (1) communicates with the refrigeration chamber (4) by means of a supply channel (3), and the apparatus further having a dispensing device (6) for the dosed output of soft ice cream from the refrigeration chamber (4), the storage bag (8) being configured to be inserted into the machine body (2) of the apparatus, wherein the bag (8) comprises an integrated single use pump (9) that includes an opening device (19) for opening the bag (8) to provide communication between the bag (8) and the refrigeration chamber (4), and wherein the single use pump (9) is configured to be connected to a pump drive (24), the bag (8) being configured to be inserted into a storage container of such an apparatus and therefore being suitable for retrofitting conventional soft ice cream machines.

9. The bag according to claim 8, characterized in that the bag (8) is configured to be inserted into a receiving cassette (22) and wherein the receiving cassette (22) is configured to in turn be inserted into the apparatus for producing soft ice cream.

10. The bag according to claim 8, characterized in that the bag (8) is configured to be placed onto the refrigeration chamber (4) of the apparatus for producing soft ice cream and is consequently suitable for soft ice cream machines which have been developed for use with bags.

11. The bag according to claim 8, characterized in that the integrated single use pump (9) is configured to be screw connected onto an outlet connecting piece (13) which is connected to the bag (8), wherein the opening device (19) does not become effective until the single use pump (9) has been screwed on completely and not until the pump penetrates elastic sleeve material of the bag (8).

12. The bag according to claim 8, characterized in that on an outlet tube (21) the single use pump (9) has a diaphragm valve (20) which is at least approximately air-tight and is configured to be coupled directly or indirectly to the supply channel (3).

13. The bag according to claim 9, characterized in that the bag (8) is configured to be tensioned in the receiving cassette (22) by means of a three-point tensioning means (9, 12).

14. The bag according to claim 9, characterized in that the single use pump (9) of the bag (8) inserted into the receiving cassette (22) is configured to be connected to the pump drive (24) such that the receiving cassette (22) with the bag (8) and the single use pump (9) and the pump drive (24) form an associated replaceable functional unit.

15. The bag according to claim 1, wherein the bag (8) is configured to be inserted into an upper region of the machine body (2).

16. The bag according to claim 8, wherein the bag (8) is configured to be inserted into an upper region of the machine body (2).

* * * * *